US008401858B2

(12) United States Patent
Yang et al.

(10) Patent No.: US 8,401,858 B2
(45) Date of Patent: Mar. 19, 2013

(54) METHOD AND SYSTEM FOR VOICE COMMUNICATION

(75) Inventors: Chih-Kang Yang, Taipei (TW); Shu-Hua Guo, Taipei (TW); Kuo-Ping Yang, Taipei (TW); Ho-Hsin Liao, Taipei (TW); Chun-Kai Wang, Taipei (TW); Sin-Chen Lin, Taipei (TW); Kun-Yi Hua, Taipei (TW); Ming-Hsiang Cheng, Taipei (TW); Chih-Long Chang, Taipei (TW)

(73) Assignee: Kuo-Ping Yang, Taipei (TW)

( * ) Notice: Subject to any disclaimer, the term of this patent is extended or adjusted under 35 U.S.C. 154(b) by 541 days.

(21) Appl. No.: 12/656,919

(22) Filed: Feb. 19, 2010

(65) Prior Publication Data

US 2011/0040565 A1 Feb. 17, 2011

(30) Foreign Application Priority Data

Aug. 14, 2009 (TW) .............................. 98127460 A

(51) Int. Cl.
*G10L 21/00* (2006.01)
(52) U.S. Cl. .................................................. 704/270.1
(58) Field of Classification Search ............... 704/270.1, 704/276, 277
See application file for complete search history.

(56) References Cited

U.S. PATENT DOCUMENTS

| | | | | |
|---|---|---|---|---|
| 6,122,614 A * | 9/2000 | Kahn et al. | .................... | 704/235 |
| 7,006,967 B1 * | 2/2006 | Kahn et al. | .................... | 704/235 |
| 7,203,652 B1 * | 4/2007 | Heck | .................... | 704/273 |
| 2003/0156689 A1 * | 8/2003 | Ando et al. | .................... | 379/88.01 |
| 2004/0186732 A1 * | 9/2004 | Okura et al. | .................... | 704/277 |
| 2005/0131673 A1 * | 6/2005 | Koizumi et al. | .................... | 704/2 |
| 2005/0171778 A1 * | 8/2005 | Sasaki et al. | .................... | 704/269 |
| 2005/0209848 A1 * | 9/2005 | Ishii | .................... | 704/231 |
| 2006/0149547 A1 * | 7/2006 | Miyazaki | .................... | 704/247 |
| 2007/0073678 A1 * | 3/2007 | Scott et al. | .................... | 707/5 |
| 2007/0153989 A1 * | 7/2007 | Howell et al. | .................... | 379/88.14 |
| 2007/0280440 A1 * | 12/2007 | Mao | .................... | 379/88.22 |
| 2008/0065383 A1 * | 3/2008 | Schroeter | .................... | 704/260 |

* cited by examiner

*Primary Examiner* — Michael N Opsasnick
(74) *Attorney, Agent, or Firm* — Bacon & Thomas, PLLC

(57) ABSTRACT

A method and a system for voice communication, especially for a user who has voice or speaking problems, are disclosed. The method requires a communication sheet and a digital voice signal processing device. The communication sheet comprises a plurality of communication units and a plurality of function units for a user to click with the digital voice signal processing device. The plurality of function units comprise a whole sentence unit, and the method comprises a method for performing a function of emitting the sound of a whole sentence, which comprises the following steps: receiving sounds of words selected by the user; searching a voice file according to each of the sounds of words; receiving a command generated by the user's clicking the whole sentence unit; and playing voice files in order.

12 Claims, 14 Drawing Sheets

| | | | | |
|---|---|---|---|---|
| 1 | | | | 0139.mp3 |
| 2 | | | | 0140.mp3 |
| 3 | | | | 0141.mp3 |
| 4 | | | | 0142.mp3 |
| 5 | | | | 0143.mp3 |
| ⋮ | ⋮ | ⋮ | ⋮ | ⋮ |
| ⋮ | ⋮ | ⋮ | ⋮ | ⋮ |
| ㄅ | | | | 0101.mp3 |
| ㄆ | | | | 0102.mp3 |
| ㄇ | | | | 0103.mp3 |
| ㄈ | | | | 0104.mp3 |
| ⋮ | ⋮ | ⋮ | ⋮ | ⋮ |
| ⋮ | ⋮ | ⋮ | ⋮ | ⋮ |
| ㄅ | ㄧ | ㄝ | ー(first tone) | 0353.mp3 |
| ⋮ | ⋮ | ⋮ | ⋮ | ⋮ |
| ⋮ | ⋮ | ⋮ | ⋮ | ⋮ |
| ㄨ | ㄚ | | ー(first tone) | 1008.mp3 |
| ㄨ | ㄚ | | ╱(second tone) | 1009.mp3 |
| ㄨ | ㄚ | | ∨(third tone) | 1010.mp3 |
| ㄨ | ㄚ | | ╲(fourth tone) | 1011.mp3 |
| ㄨ | ㄚ | | • (neutral tone) | 1012.mp3 |
| ㄨ | ㄛ | | ー(first tone) | 1013.mp3 |
| ㄨ | ㄛ | | ∨(third tone) | 1014.mp3 |
| ㄨ | ㄛ | | ╲(fourth tone) | 1015.mp3 |
| ⋮ | ⋮ | ⋮ | ⋮ | ⋮ |
| ⋮ | ⋮ | ⋮ | ⋮ | ⋮ |

| 94 → | 01 | 02 | 03 | 04 | 05 | 06 | 07 | 08 | 09 | 10 | 11 | 12 | 13 | 14 | ... | 23 |
|---|---|---|---|---|---|---|---|---|---|---|---|---|---|---|---|---|
| | 0995 | 0102, 0766, 0984, 0863, 0414, 0517 | 0138, 0916, 0834 | ... | ... | ... | ... | ... | ... | ... | ... | ... | ... | ... | ... | 1014, 0142, 0254, 0419, 0688 ← 93 / 93 / 93 / 93 / 93 |

FIG. 7

| | | | | | | 66 | 67 | 68 | 61 |
|---|---|---|---|---|---|---|---|---|---|
| ↓ | ✎ | ◊ | ⚒ | | ▲ | ● | ↵ | ✕ | 🗑 |
| 1 | 2 | 3 | 4 | 5 | 6 | 7 | 8 | 9 | 0 |
| n | l | s | ao | ong | yāo | ˉ | ˋ | ˇ | ˊ |
| t | x | c | ei | eng | yīng | wēi | wēng | • | ʼ |
| d | q | z | ai | ang | yāi | yāng | wāi | wāng | |
| f | j | r | e | en | yē | yīn | yáng | wēn | yuē |
| m | h | sh | o | an | yō | yān | wō | wān | yū |
| p | k | ch | a | ou | yā | yóu | wā | | yuān |
| b | g | zh | ê | er | yi | wu | | yu | |

FIG. 10

| | |
|---|---|
| 1 | 000139.mp3 |
| 2 | 000140.mp3 |
| 3 | 000141.mp3 |
| 4 | 000142.mp3 |
| 5 | 000143.mp3 |
| ⋮ | ⋮ |
| ⋮ | ⋮ |
| 95 a | 000101.mp3 |
| 95 b | 000102.mp3 |
| 95 c | 000103.mp3 |
| 95 d | 000104.mp3 |
| ⋮ | ⋮ |
| ⋮ | ⋮ |
| apple | 001234.mp3 |
| apples | 001234p.mp3 |
| ⋮ | ⋮ |
| ⋮ | ⋮ |
| I | 002345.mp3 |
| ⋮ | ⋮ |
| ⋮ | ⋮ |
| eat | 017890.mp3 |
| ate | 017890b.mp3 |
| eating | 017890n.mp3 |
| ⋮ | ⋮ |
| ⋮ | ⋮ |

METHOD AND SYSTEM FOR VOICE COMMUNICATION

BACKGROUND OF THE INVENTION

1. Field of the Invention

The present invention relates to a method and system for voice communication; more particularly, the present invention relates to a method and system for voice communication especially provided for users who have voice or speaking problems.

2. Description of the Related Art

A voice communication system is designed as a communication tool used for providing assistance or substitution in oral communication for those who have voice or speaking problems. With regard to a common voice communication system, although it has a recording function, it allows a person who can speak normally only to record his/her voice via a microphone. Therefore, the conventional voice communication system can only play a pre-recorded voice without letting a person who has voice or speaking problems record words or expressions in other ways than directly emitting sounds. Further, with regard to such a recording mechanism, the recorded voice files may occupy too much storage space.

Moreover, the conventional voice communication system does not offer a real-time function for a user to express a whole sentence. The conventional voice communication system only plays the sound of a word whenever the user clicks it, rather than playing the sound of a whole sentence after the user completes the input of the whole sentence (including a plurality of words), which is very inconvenient to the user.

Therefore, there is a need to provide a method and system for voice communication, such that users who have voice or speaking problems can utilize the method and system for voice communication to emit sound so as to pertinently express themselves, thereby improving their lives as well as mitigating and/or obviating the aforementioned problems.

SUMMARY OF THE INVENTION

It is an object of the present invention to provide a method and system for voice communication for providing assistance or substitution in oral communication, such that users who have voice or speaking problems can utilize the method and system for voice communication to emit sound so as to pertinently express themselves.

To achieve the abovementioned object, the method for voice communication of the present invention is accomplished by a communication sheet and a digital voice signal processing device. The communication sheet comprises a plurality of communication units and a plurality of function units for a user to click with the digital voice signal processing device. The plurality of function units comprise a whole sentence unit. The method for voice communication comprises a method for performing a function of emitting the sound of a whole sentence, which comprises the following steps: receiving a plurality of sounds of words selected from the plurality of communication units by the user; searching for voice files each respectively corresponding to each of the sounds of words; receiving a whole sentence command generated after the user clicks the whole sentence unit; and sequentially playing each of the voice files.

Other objects, advantages, and novel features of the invention will become more apparent from the following detailed description when taken in conjunction with the accompanying drawings.

BRIEF DESCRIPTION OF THE DRAWINGS

These and other objects and advantages of the present invention will become apparent from the following description of the accompanying drawings, which disclose several embodiments of the present invention. It is to be understood that the drawings are to be used for purposes of illustration only, and not as a definition of the invention.

In the drawings, wherein similar reference numerals denote similar elements throughout the several views:

FIG. 7 illustrates a schematic drawing showing recognition information of each voice file recorded in each storage location according to the present invention.

FIG. 10 illustrates a schematic drawing of the communication sheet of phonetic symbols according to the present invention.

DETAILED DESCRIPTION OF THE PREFERRED EMBODIMENT

Figure 1:
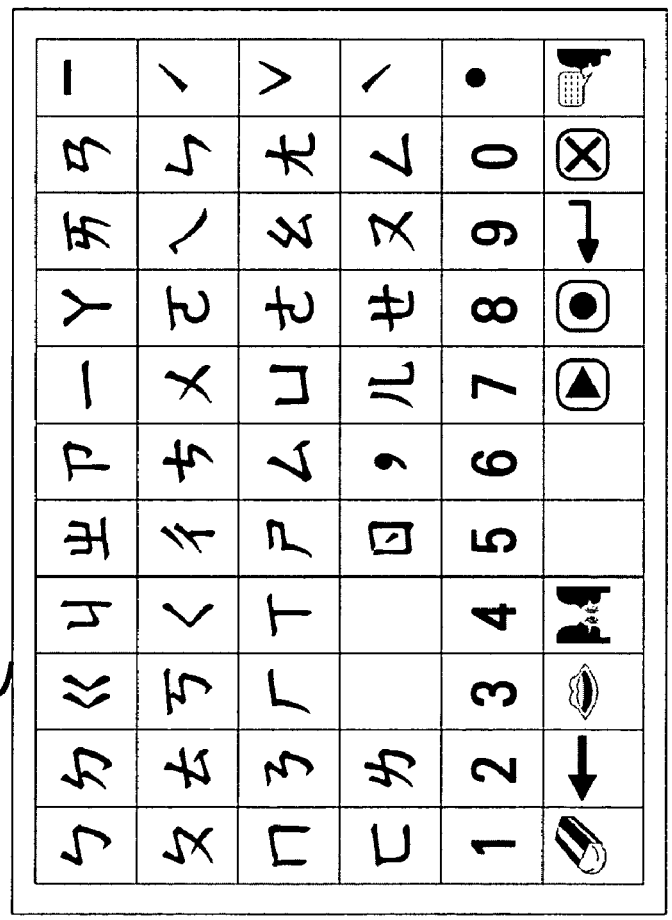
FIG. 1 illustrates a schematic drawing of a system for voice communication according to the present invention.

Please refer to FIG. 1, which illustrates a schematic drawing of a system for voice communication 1 according to the present invention. The system for voice communication 1 of the present invention comprises a digital voice signal processing device 8 and a communication sheet 10. The communication sheet 10 is associated with the digital voice signal processing device 8, so as to achieve the object of providing assistance or substitution in oral communication. This present invention is specially designed for those who have voice or speaking problems, such as physically and mentally disabled people, stroke patients, senior citizens, or people with motor nerve injuries.

Figure 2:
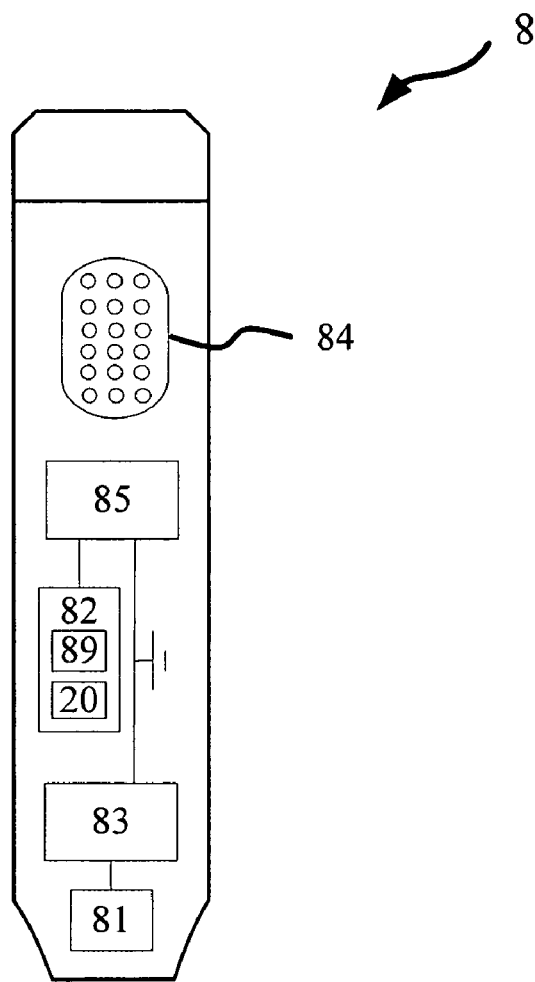
FIG. 2 illustrates a schematic drawing of a digital voice signal processing device according to the present invention.

Please refer to FIG. 2, which illustrates a schematic drawing of the digital voice signal processing device 8 according to the present invention. The digital voice signal processing device 8 of the present invention comprises: a reading module 81, used for reading information; a storage device 82 (such as a memory or a memory card), stored with a software program 89, a speech database 20, and other sound information; a decoding module 83, used for decoding the information read by the reading module 81; an audio output device 84, used for emitting sound; and a processing unit 85. The processing unit 85 is electrically connected with the reading module 81 (which is basically composed of a lens and a charge-coupled device (CCD) or a complementary metal oxide semiconductor (CMOS)), the storage device 82, the decoding module 83, and the audio output device 84. The processing unit 85 is used for controlling the reading module 81, the storage device 82, the decoding module 83, and the audio output device 84 (such as a speaker). The hardware of the digital voice signal processing device 8 (also known as an optical index/optical identification (OID) pen) is a known device; therefore, there is no need for further description.

Figure 3:
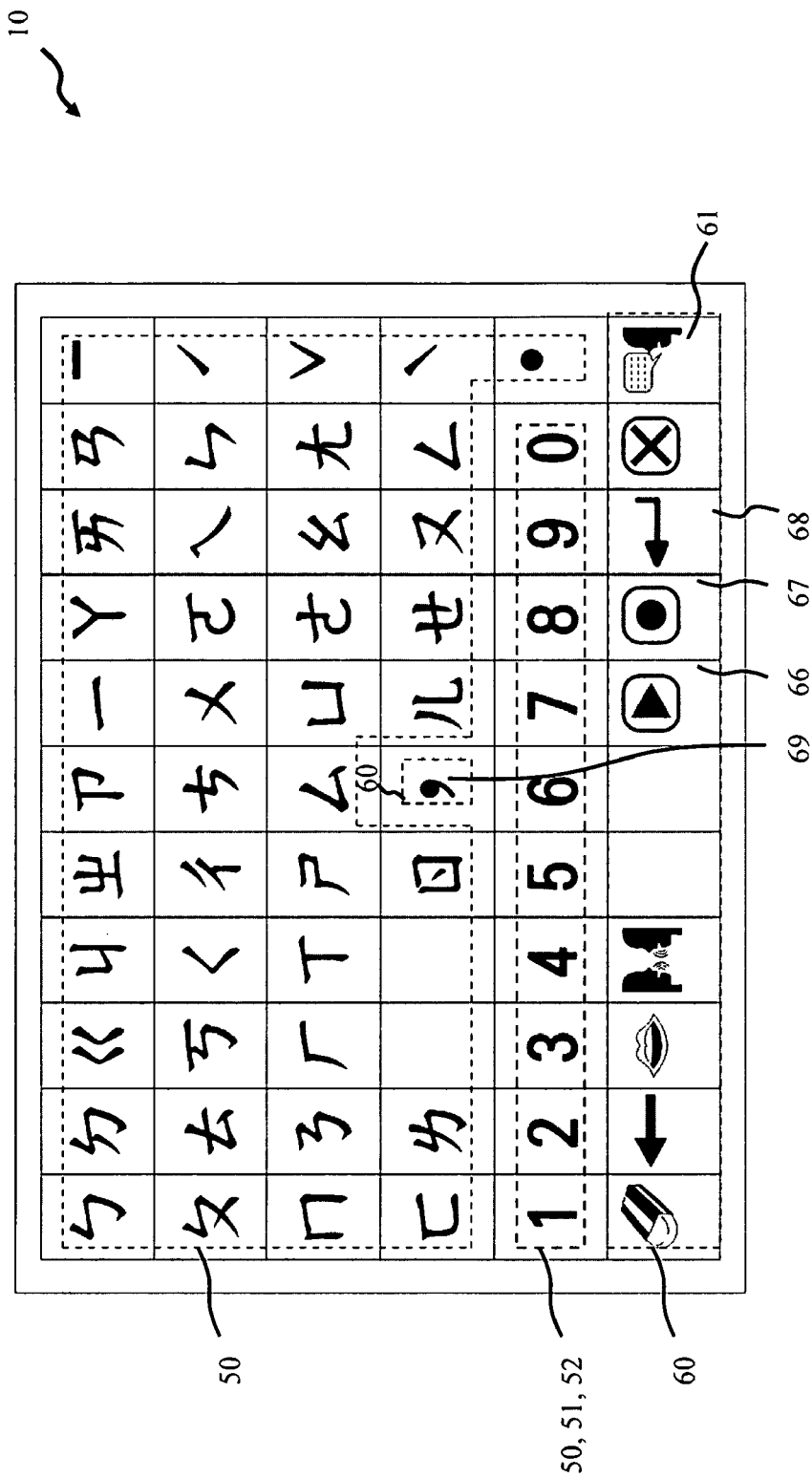
FIG. 3 illustrates a schematic drawing of a communication sheet of Mandarin phonetic symbols according to one embodiment of the present invention.
Figure 3A:
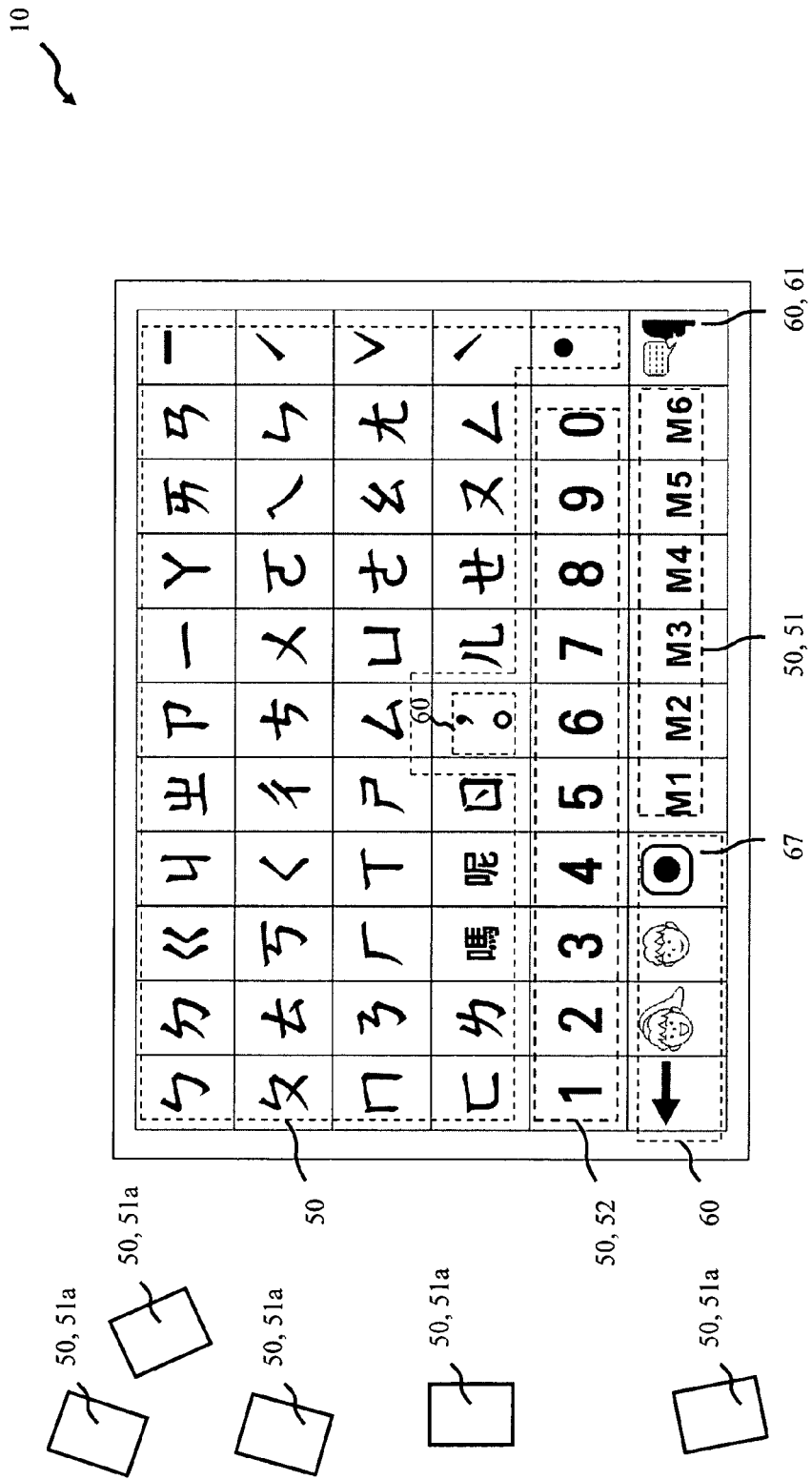
FIG. 3A illustrates a schematic drawing of the communication sheet of Mandarin phonetic symbols according to another embodiment of the present invention.
Figure 3B:
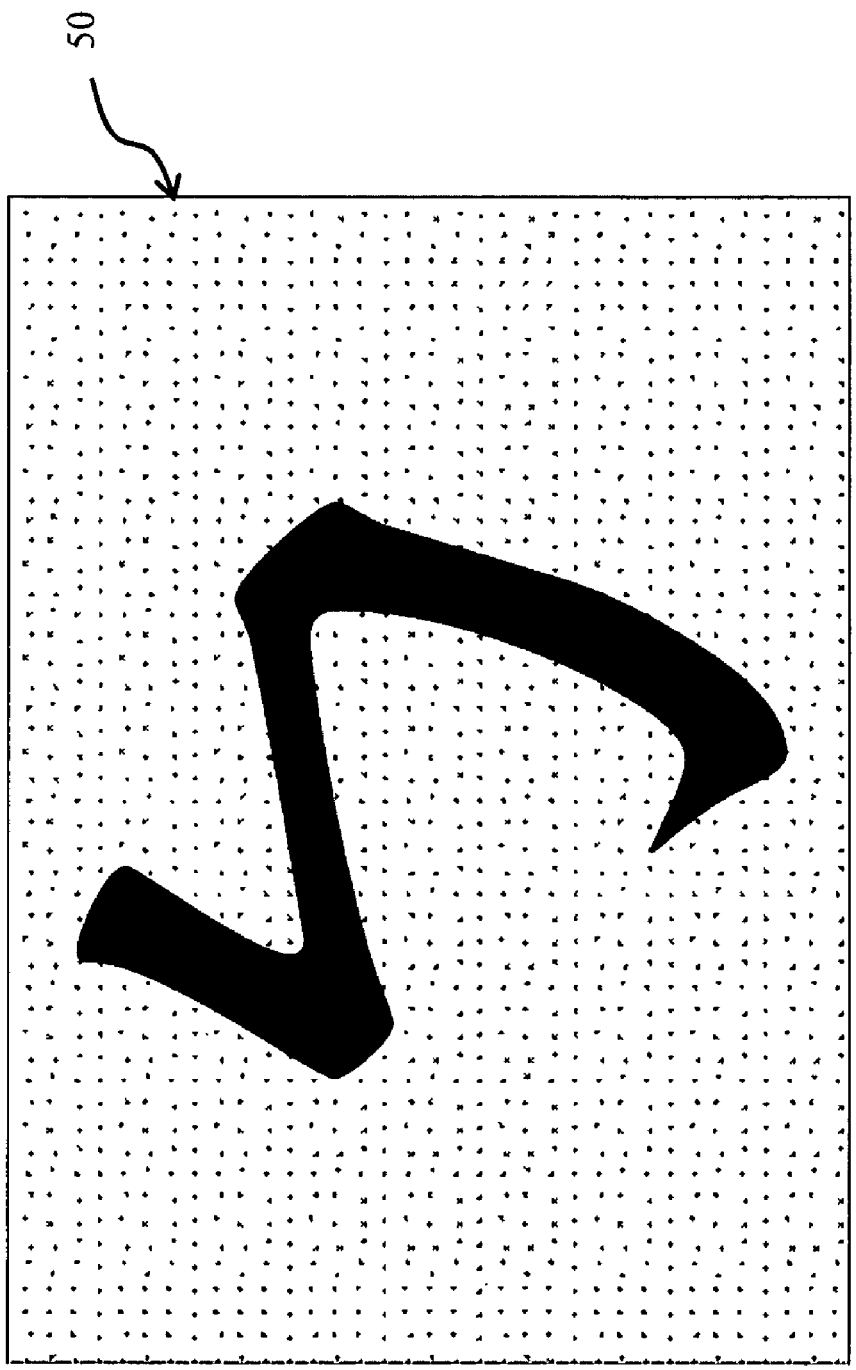
FIG. 3B illustrates a schematic drawing of a communication unit and its identification code according to the present invention.

Please refer to both FIG. 3 and FIG. 3A. FIG. 3 illustrates a schematic drawing of the communication sheet of Mandarin phonetic symbols according to one embodiment of the present invention, and FIG. 3A illustrates a schematic drawing of the communication sheet of Mandarin phonetic symbols according to another embodiment of the present invention. Please refer to FIG. 3. In one embodiment of the present invention, the communication sheet 10 is a thin object (such as a piece of paper, a paper-shaped object, or a thin panel) with a printed layer attached thereon. Preferably, toner or printing ink is printed on the thin object via a printing machine, a laser printer, or an inkjet printer. Practically, the thin object can also be attached to a piece of board or cardboard for convenience. The communication sheet 10 comprises a plurality of communication units 50 (such as the Mandarin phonetic symbols "ㄅ", "ㄉ" or "ㄍ", and the numbers "1", "2" or "3") and a plurality of function units 60. Each communication unit 50 or each function unit 60 has an identification code for the digital voice signal processing device 8 to identify. The identification code of each of the communication units 50 and the function units 60 is different. In the embodiment, the identification code is a relatively small spotcode (such as a 2D barcode). Basically, a magnifier is required to clearly view the identification code. Please refer to FIG. 3B. In the communication unit 50 of a Mandarin phonetic symbol "ㄅ", a corresponding identification code is printed around "ㄅ". That is, the identification code is a spotcode (such as a 2D barcode representing "00053") formed by many tiny spots, as shown in FIG. 3B. Please refer to FIG. 3A; in another embodiment of the present invention, the major difference between the communication sheet 10 in FIG. 3 and that in FIG. 3A is that the communication sheet 10 in FIG. 3A further comprises a plurality of storage location units 51a which can be placed anywhere by the user. Each of the storage location units 51a is printed with a different identification code. The storage location units 51a can be in the form of a sticker for the user to freely attach to any location. The method of using the storage location units 51a will be described in detail hereinafter.

The following description will explain the cooperation of the digital voice signal processing device 8 and the communication sheet 10. The user utilizes the digital voice signal processing device 8 to click a certain communication unit 50 or function unit 60. For example, the user clicks the communication unit 50 of "ㄅ". The reading module 81 obtains an image of the identification code of the communication unit 50 of "ㄅ". Next, the decoding module 83 decodes the identification code (such as "00053"). According to decoded information of the identification code (such as "00053"), the processing unit 85 can retrieve corresponding voice information (such as a voice file, stored in the storage device 82, capable of emitting the sound of "ㄅ"), such that the audio output device 84 can emit the sound of "ㄅ" in Mandarin.

Figure 4:
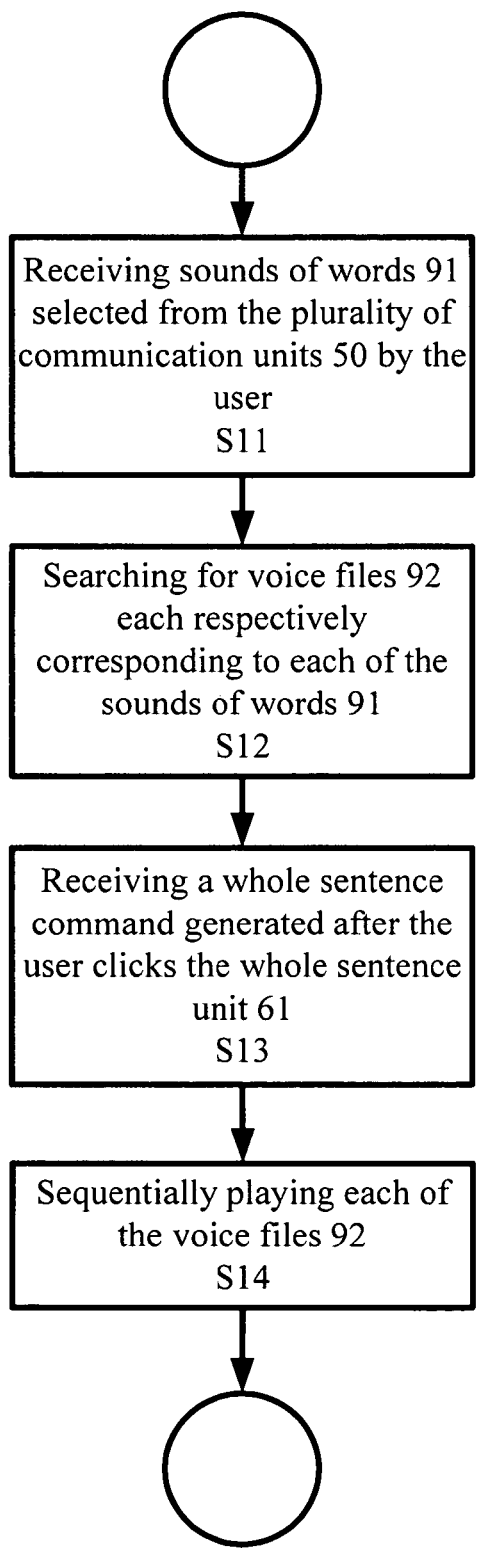
FIG. 4 illustrates a flowchart of a method for performing a function of emitting the sound of a whole sentence according to the present invention.

Each function of the system for voice communication 1 of the present invention will be described next. Please refer to FIG. 3; the plurality of communication units 50 comprise a plurality of number units 52 for the user to select at least one number. In this embodiment, the plurality of communication units 50 further comprise thirty-seven Mandarin phonetic symbols and five tone mark symbols (namely the first tone "—", the second tone "ˊ", the third tone "ˇ", the fourth tone "ˋ" and the neutral tone "•"). The plurality of function units 60 allow the user to select different functions for association with the communication units 50. In the following description, the user always utilizes the digital voice signal processing device 8 to click each of the communication units 50 or each of the function units 60. The plurality of function units 60 comprise a whole sentence unit 61. The method for voice communication of the present invention comprises a method for performing a function of emitting the sound of a whole sentence. Please refer to FIG. 4, which illustrates a flowchart of the method for performing the function of emitting the sound of a whole sentence according to the present invention. The method for performing the function of emitting the sound of a whole sentence comprises the following steps:

Step S11: Receiving a plurality of sounds of words 91 selected from the plurality of communication units 50 by the user. For example, if the user wants to express the sound of "我4點下課 (I'll finish my class at 4 o'clock)" in Mandarin, the user then sequentially clicks "ㄨㄛˇ 4 ㄉㄧㄢˇ ㄒㄧㄚˋ ㄎㄜˋ" from the communication units 50. Therefore, five sounds of words 91 in Mandarin ("ㄨㄛˇ", "4", "ㄉㄧㄢˇ", "ㄒㄧㄚ" and "ㄎㄜˋ") will be generated accordingly.

Figure 5:
FIG. 5 illustrates a schematic drawing of a speech database according to one embodiment of the present invention.

Step S12: Searching for voice files 92, each respectively corresponding to each of the sounds of words 91. Please refer to FIG. 5; the software program 89 first searches for a voice file 92 (such as "1014.mp3") corresponding to the sound of a word 91 "ㄨㄛˇ" from the speech database 20. Likewise, the software program 89 then searches for the remaining four voice files 92 (such as "0142.mp3", "0254.mp3", "0419.mp3" and "0688.mp3"), each sequentially and respectively corresponding to the sounds of words 91 "4", "ㄉㄧㄢˇ", "ㄒㄧㄚ" and "ㄎㄜˋ".

Step S13: Receiving a whole sentence command generated after the user clicks the whole sentence unit 61. When the user clicks the whole sentence unit 61, the digital voice signal processing device 8 will accordingly read the identification code from the whole sentence unit 61, so as to generate a whole sentence command.

Step S14: Sequentially playing each of the voice files 92. In this embodiment, in this step, the digital voice signal processing device 8 sequentially plays the voice files 92 of "1014.mp3", "0142.mp3", "0254.mp3", "0419.mp3" and "0688.mp3", such that the audio output device 84 will emit the sound of "我4點下課 (I'll finish my class at 4 o'clock)" in Mandarin.

Please refer to FIG. 3; the plurality of function units 60 may further comprise a memory unit 67 and a memory playback unit 66. The method for voice communication of the present invention further comprises a method for performing a memory function, and a method for performing a function of emitting memory sound; both methods will be respectively described hereinafter.

Figure 6:
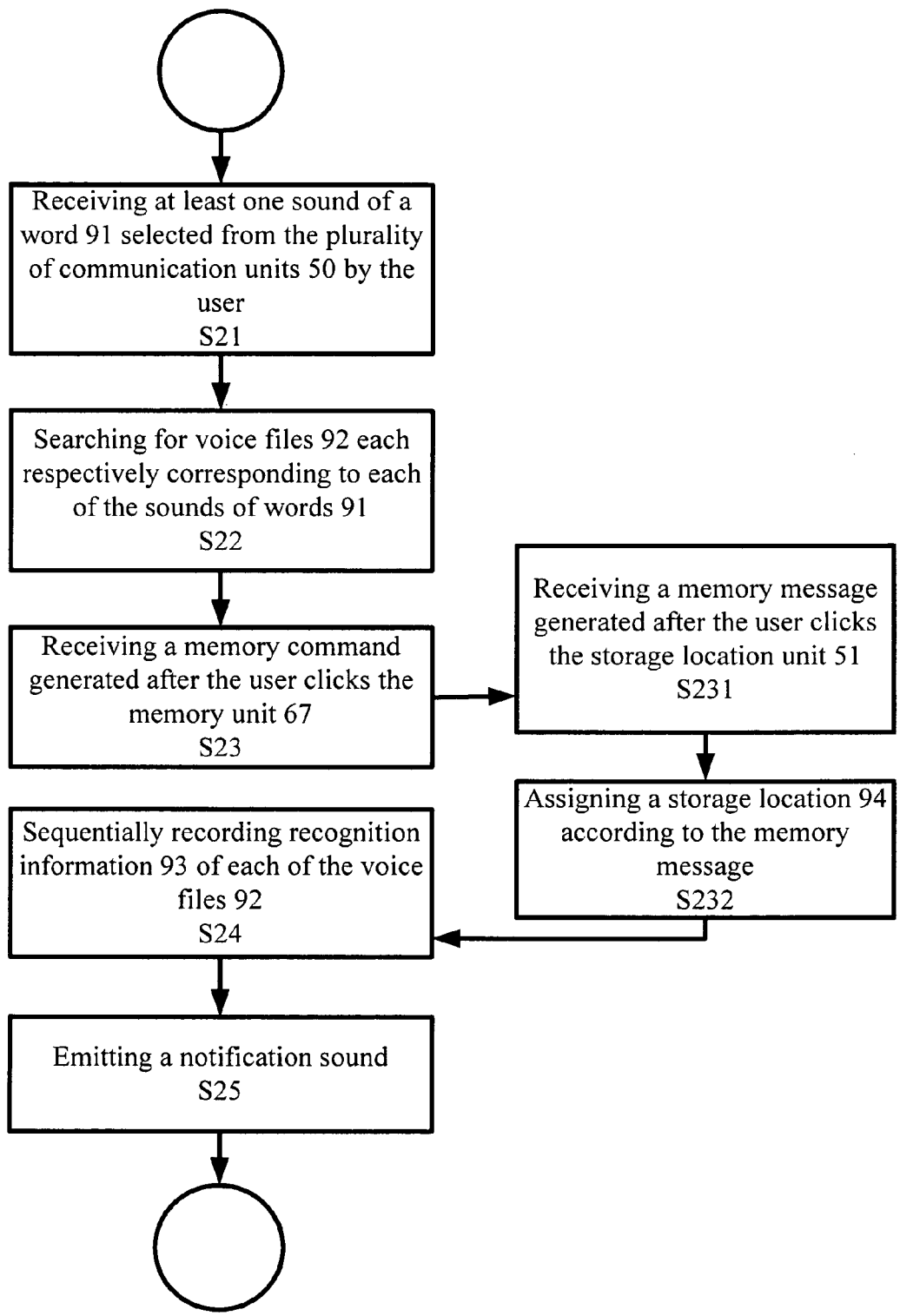
FIG. 6 illustrates a flowchart of a method for performing a memory function according to the present invention.

The memory unit 67 allows the user to record frequently-used sentences. Therefore, if the user wants to express the same sentence in the future, the user can simply utilize the memory playback unit 66 to play it, so as to save time. Please refer to FIG. 6; the method for performing the memory function comprises the following steps:

Step S21: Receiving at least one sound of a word 91 selected from the plurality of communication units 50 by the user. For example, if the user sequentially clicks "ㄨㄛˇ 4 ㄉㄧㄢˇ ㄒㄧㄚˋ ㄎㄜˋ" from the communication units 50, five sounds of words 91 (in Mandarin) ("ㄨㄛˇ", "4", "ㄉㄧㄢˇ", "ㄒㄧㄚˋ" and "ㄎㄜˋ") will be generated accordingly.

Step S22: Searching for voice files 92, each respectively corresponding to each of the sounds of words 91. Please refer to FIG. 5; the software program 89 first searches for the voice file 92 (such as "1014.mp3") corresponding to the sound of a word 91 "ㄨㄛˇ" from the speech database 20. Likewise, the software program 89 then searches for the remaining four voice files 92 (such as "0142.mp3", "0254.mp3", "0419.mp3" and "0688.mp3"), each sequentially and respectively corresponding to the sounds of words 91 "4", "ㄉㄧㄢˇ", "ㄒㄧㄚˋ" and "ㄎㄜˋ".

Step S23: Receiving a memory command generated after the user clicks the memory unit 67. When the user clicks the memory unit 67, the digital voice signal processing device 8 will accordingly read the identification code from the memory unit 67, so as to generate a memory command.

Step S24: Sequentially recording recognition information 93 of each of the voice files 92. For example, the recognition information 93 can be a filename. Therefore, this step sequentially records the filenames of, for example, "1014", "0142", "0254", "0419" and "0688".

Please refer to both FIG. 3 and FIG. 3A. The plurality of communication units 50 can comprise a plurality of storage location units 51. Therefore, the user can utilize the storage location units 51 to assign a storage location for saving the recognition information 93 of each voice file 92 recorded by the memory unit 67. In such a way, more than one frequently-used sentence can be saved. Therefore, if the user wants to express the same sentence on another occasion, the user needs only to select a desired pre-saved sentence, without starting over. In one embodiment of the present invention, the number units 52 are also used as the storage location units 51 (as shown in FIG. 3), but please note that the scope of the present invention is not limited to the above description. In another embodiment of the present invention, the storage location units 51 are other communication units 50 (as shown in FIG. 3A).

Please return to FIG. 6; the above step S23 can further comprise the following steps:

Step S231: Receiving a memory message generated after the user clicks at least one storage location unit 51 of the plurality of storage location units 51. In one embodiment of the present invention (as shown in FIG. 3), because the number units 52 are also used as the storage location units 51, the user can click "2" and "3" from the number units 52 to generate a memory message of "23". Further, the plurality of function units 60 can further comprise a confirmation unit 68 for the user to confirm actions completed by means of utilizing the memory unit 67 or the memory playback unit 66. In one preferred embodiment of the present invention, after clicking "2" and "3", the user further clicks the confirmation unit 68 to confirm the completion of this step. In another embodiment of the present invention (as shown in FIG. 3A), the user can click "M1" from the storage location unit 51 to generate a memory message of "M1". In another embodiment of the present invention (also shown in FIG. 3A), the user can also click any of the storage location units 51a, which are in the form of a sticker. Similarly, a memory message will be generated according to the identification code from the selected storage location unit 51a.

Step S232: Assigning a storage location 94 according to the memory message. Please also refer to FIG. 7. In one embodiment of the present invention, this step will assign a storage location 94 in the storage device 82 according to the memory message of "23". In another embodiment of the present invention, the software program 89 can also assign a storage location 94 according to the memory message of "M1", as long as each of the storage location units 51 corresponds to a different storage location 94.

Furthermore, step S24 will substantially and sequentially record the recognition information 93 of each of the voice files 92 into the storage location 94. Please refer to FIG. 7; as a result, the recognition information 93 (such as "1014, 0142, 0254, 0419, 0688") of each of the voice files 92 would be sequentially stored in the storage location 94 of "23".

In one embodiment of the present invention, the method for performing the memory function further comprises step S25: Emitting a notification sound. Finally, the digital voice signal processing device 8 emits a notification sound to inform the user that the information has been successfully saved.

Figure 8:
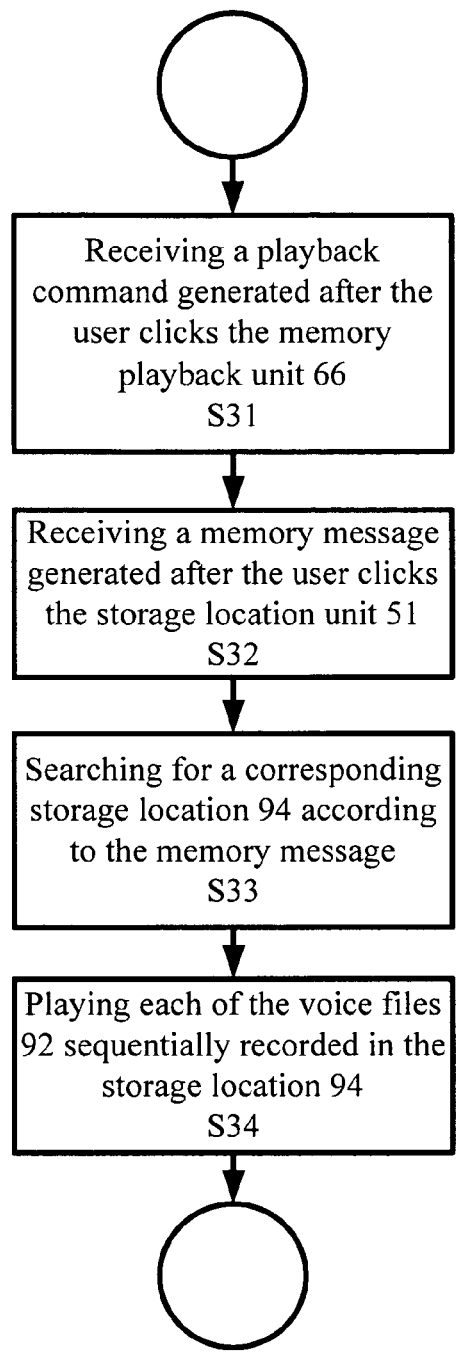
FIG. 8 illustrates a flowchart of a method for performing a function of emitting memory sound according to the present invention.

Now please refer to both FIG. 8 and FIG. 3. According to one embodiment of the present invention, the method for performing the function of emitting memory sound comprises the following steps:

Step S31: Receiving a playback command generated after the user clicks the memory playback unit 66. When the user clicks the memory playback unit 66, the digital voice signal processing device 8 will accordingly read the identification code from the memory playback unit 66, so as to generate a playback command.

Step S32: Receiving a memory message generated after the user clicks at least one storage location unit 51 of the plurality of storage location units 51. The user can click "2" and "3" from the number units 52 to generate a memory message of "23". Further, similar to the memory function, in one preferred embodiment of the present invention, after clicking "2" and "3", the user further clicks the confirmation unit 68 to confirm the completion of this step Step S33: Searching for a corresponding storage location 94 according to the memory message. Please refer to FIG. 7 as well; in this embodiment, the software program 89 searches for a corresponding storage location 94 from the storage device 82 according to the memory message of "23", so as to find the storage location 94 of "23" accordingly.

Step S34: Playing each of the voice files 92 sequentially recorded in the storage location 94. In this embodiment, this step plays each of the voice files 92 sequentially recorded in the storage location 94 of "23". Therefore, according to the recognition information 93 (such as "1014, 0142, 0254, 0419, 0688"), the voice files 92 of "1014.mp3", "0142.mp3", "0254.mp3", "0419.mp3" and "0688.mp3" will be sequentially played, such that the audio output device 84 will emit the sounds of "我4點下課 (I'll finish my class at 4 o'clock)" in Mandarin.

In another embodiment of the present invention, the above-mentioned step S31 can be skipped. Please refer to both FIG.

8 and FIG. 3A. In this embodiment, if the user clicks the storage location unit 51 of "M1" shown in FIG. 3A in step S32, the memory message of "M1" will be generated accordingly. Then in step S33, the software program 89 searches for a corresponding storage location 94 from the storage device 82 according to the memory message of "M1". Next, in step S34, the software program 89 plays each of the voice files 92 sequentially recorded in the storage location 94. In step S231, if the user clicks a certain storage location unit 51a, because the storage location unit 51a can be in the form of a sticker, the user can attach it to anywhere. For example, the user saves the sentence of "請記得關燈 (Please remember to turn off the light)" into a storage location 94 corresponding to a certain storage location unit 51a, and then attaches the storage location unit 51a on a door. Therefore, whenever the user wants to go out, the user can just click the storage location unit 51a, and the digital voice signal processing device 8 will play "請記得關燈 (Please remember to turn off the light)" in Mandarin, which is very convenient to the user.

Please refer to FIG. 3; the plurality of function units 60 can further comprise a comma unit 69 to separate the sentences, such that the user can express his/her thoughts in a more pertinent manner.

Figure 9:
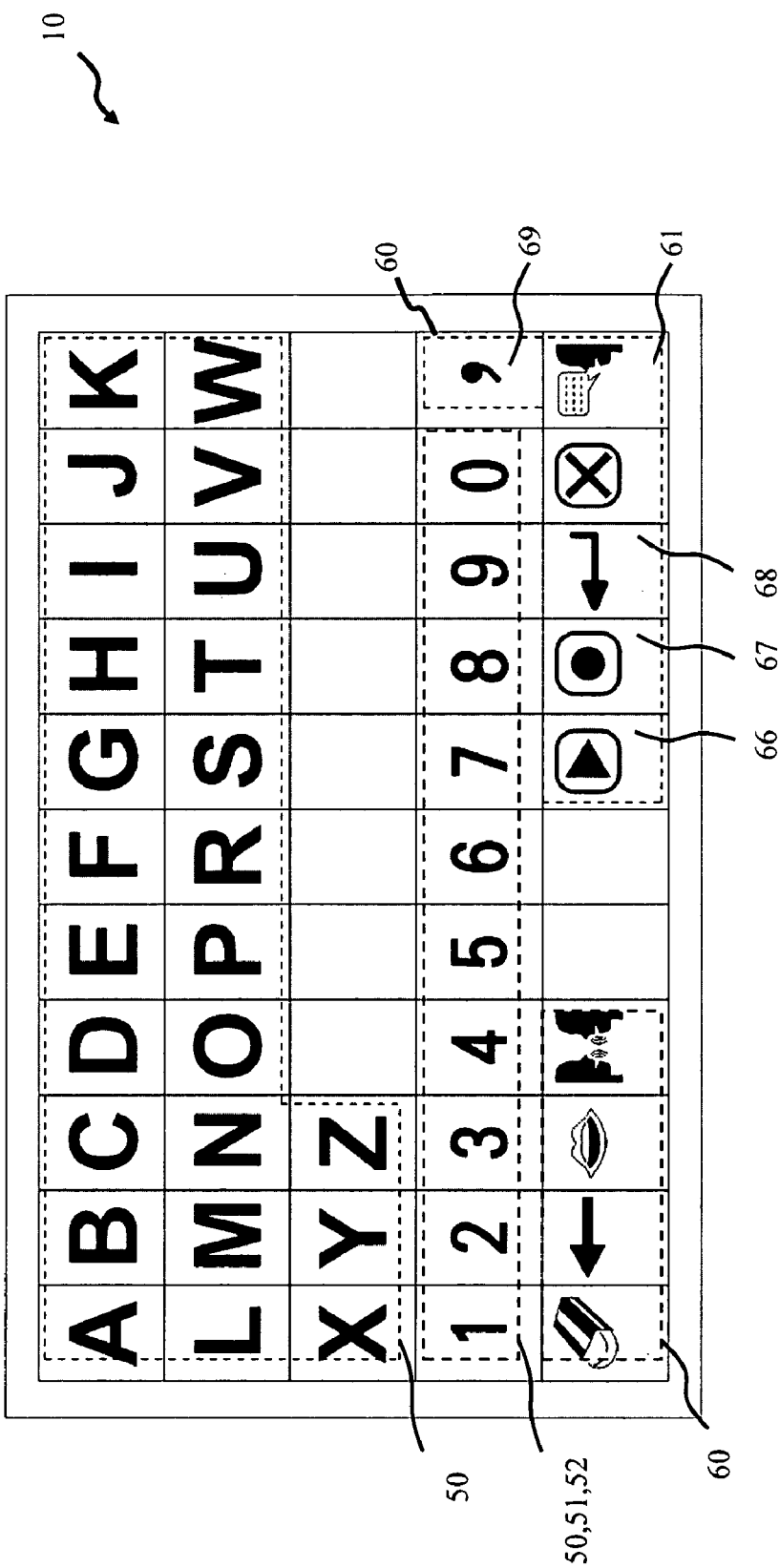
FIG. 9 illustrates a schematic drawing of the communication sheet of English letters according to the present invention.
Figure 11:
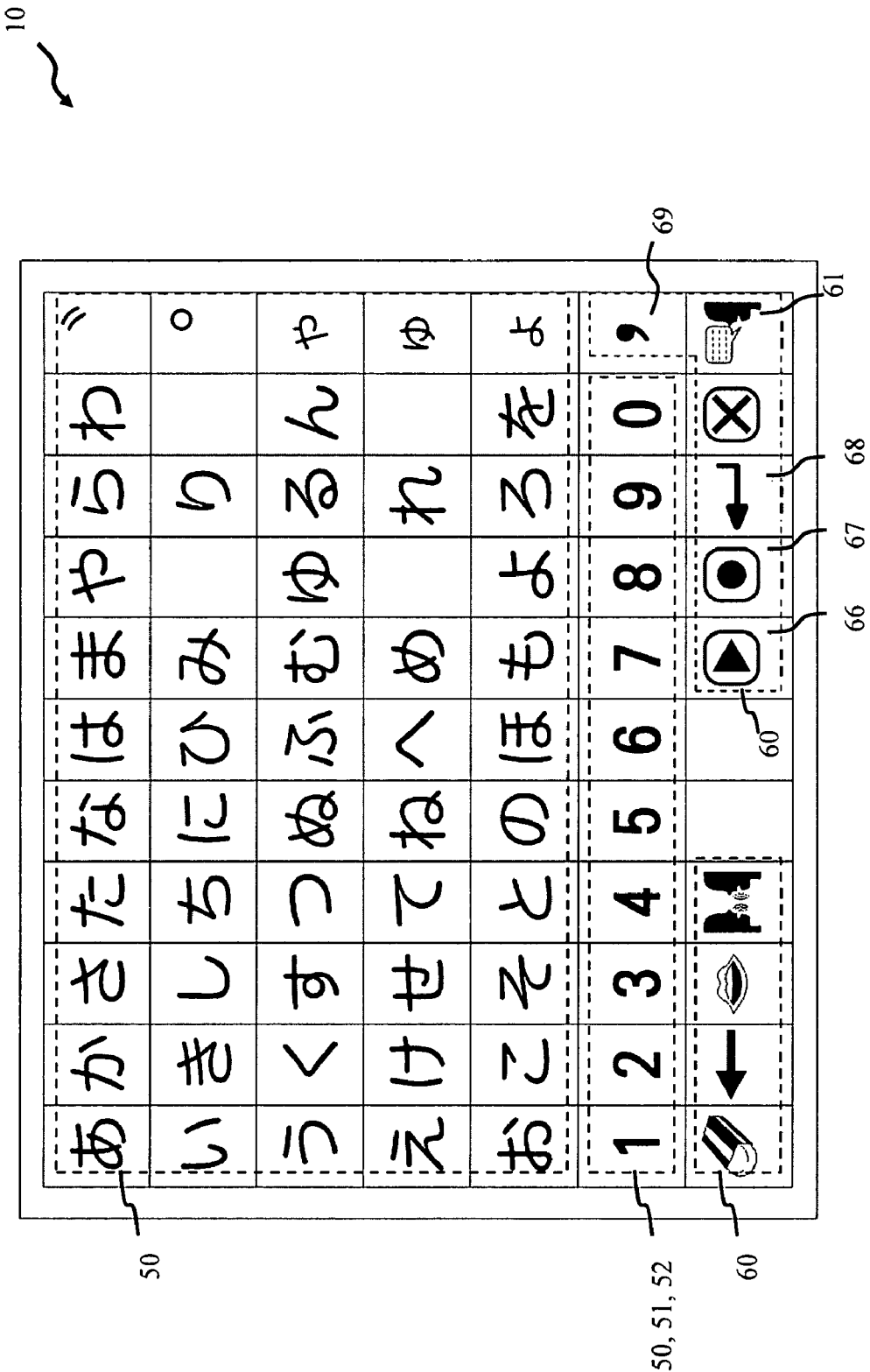
FIG. 11 illustrates a schematic drawing of the communication sheet of Japanese characters according to the present invention.
Figure 12:
FIG. 12 illustrates a schematic drawing of the speech database according to another embodiment of the present invention.

In the abovementioned embodiments, Mandarin phonetic symbols (also know as "Zhuyin fuhao" or "Bopomofo") are used as examples to explain the concept of the present invention. However, please note that the plurality of communication units 50 can also comprise the English letters, phonetic symbols (also know as "Pinyin"), or Japanese characters respectively shown in FIGS. 9~11; of course, letters/symbols/characters in other languages can also be included. Please refer to both FIG. 12 and FIG. 9, wherein FIG. 12 illustrates a schematic drawing of the English speech database 20 according to another embodiment of the present invention. In the speech database 20 of FIG. 12, each of the numbers, English letters, and English words respectively corresponds to a voice file 92. The user can utilize the method for performing the memory function and the method for performing the function of emitting memory sounds to save English words (such as "apples") or sentences (such as "I ate apples") in advance. Therefore, the user can play the pre-saved words or sentences later on if necessary. Because the operations of the communication sheet 10 of letters/symbols/characters in other languages are similar to that of the communication sheet 10 of Mandarin phonetic symbols, there is no need for further description.

Although the present invention has been explained in relation to its preferred embodiments, it is to be understood that many other possible modifications and variations can be made without departing from the spirit and scope of the invention as hereinafter claimed.

What is claimed is:

1. A method for voice communication, accomplished by a communication sheet and a digital voice signal processing device, the communication sheet comprising a plurality of communication units and a plurality of function units for a user to click with the digital voice signal processing device, the plurality of function units comprising a whole sentence unit, the method comprising a method for performing a function of emitting the sounds of a whole sentence, which comprises the following steps:
(A) receiving a plurality of sounds of words selected from the plurality of communication units by the user;
(B) searching for voice files each respectively corresponding to each of the sounds of words;
(C) receiving a whole sentence command generated after the user clicks the whole sentence unit;
(D) sequentially playing each of the voice files;
wherein the plurality of function units further comprise a memory unit, and the method further comprises a method for performing a memory function, which comprises the following steps:
(E) receiving at least one sound of a word selected from the plurality of communication units by the user;
(F) searching for voice files each respectively corresponding to each of the sounds of words;
(G) receiving a memory command generated after the user clicks the memory unit; and
(H) sequentially recording recognition information of each of the voice files;
wherein the plurality of communication units further comprise a plurality of storage location units, and step (G) further comprises the following steps:
(G1) receiving a memory message generated after the user clicks at least one storage location unit of the plurality of storage location units; and
(G2) assigning a storage location according to the memory message;
wherein step (H) substantially and sequentially records the recognition information of each of the voice files into the storage location.

2. The method for voice communication as claimed in claim 1, wherein the method for performing the memory function further comprises the following step:
(I) emitting a notification sound.

3. The method for voice communication as claimed in claim 1, wherein the plurality of communication units further comprise a plurality of number units for the user to select at least one number, and the plurality of number units can be associated with the memory unit.

4. The method for voice communication as claimed in claim 1 further comprising a method for performing a function of emitting memory sound, which comprises the following steps:
(J) receiving a memory message generated after the user clicks at least one storage location unit of the plurality of storage location units;
(K) searching for a corresponding storage location according to the memory message; and
(L) playing each of the voice files sequentially recorded in the storage location.

5. The method for voice communication as claimed in claim 4, wherein the plurality of function units further comprise a memory playback unit, and the method for performing a function of emitting memory sounds further comprises the following step before step (I):
(M) receiving a playback command generated after the user clicks the memory playback unit.

6. The method for voice communication as claimed in claim 5, wherein the plurality of function units further comprise a confirmation unit for the user to confirm actions completed by means of utilizing the memory unit or the memory playback unit.

7. A system for voice communication, comprising a communication sheet and a digital voice signal processing device, the communication sheet comprising a plurality of communication units and a plurality of function units for a user to click with the digital voice signal processing device, the plurality of function units comprising a whole sentence unit, the digital voice signal processing device comprising a storage device stored with a software program for performing a function of emitting the sounds of a whole sentence, the software program comprising the following program codes:

a first program code: receiving a plurality of sounds of words selected from the plurality of communication units by the user;

a second program code: searching for voice files each respectively corresponding to each of the sounds of words;

a third program code: receiving a whole sentence command generated after the user clicks the whole sentence unit;

a fourth program code: sequentially playing each of the voice files;

wherein the plurality of function units further comprise a memory unit, and the software program further performs a memory function, the software program further comprising the following program codes:

a fifth program code: receiving at least one sound of a word selected from the plurality of communication units by the user;

a sixth program code: searching for voice files, each respectively corresponding to each of the sounds of words;

a seventh program code: receiving a memory command generated after the user clicks the memory unit; and an eighth program code: sequentially recording recognition information of each of the voice files;

wherein the plurality of communication units further comprise a plurality of storage location units, the seventh program code further comprising:

a ninth program code: receiving a memory message generated after the user clicks at least one storage location unit of the plurality of storage location units; and a tenth program code: assigning a storage location according to the memory message;

wherein the eighth program code substantially and sequentially records the recognition information of each of the voice files into the storage location.

8. The system for voice communication as claimed in claim 7, wherein the software program further comprises the following program code:

an eleventh program code: emitting a notification sound.

9. The system for voice communication as claimed in claim 7, wherein the plurality of communication units further comprise a plurality of number units for the user to select at least one number, and the plurality of number units can be associated with the memory unit.

10. The system for voice communication as claimed in claim 7, wherein the software program further performs a function of emitting memory sound, and the software program further comprises the following program codes:

a twelfth program code: receiving a memory message generated after the user clicks at least one storage location unit of the plurality of storage location units;

a thirteenth program code: searching for a corresponding storage location according to the memory message; and a fourteenth program code: playing each of the voice files sequentially recorded in the storage location.

11. The system for voice communication as claimed in claim 10, wherein the plurality of function units further comprise a memory playback unit, and the software program further comprises the following program code:

a fifteenth program code: receiving a playback command generated after the user clicks the memory playback unit.

12. The system for voice communication as claimed in claim 11, wherein the plurality of function units further comprise a confirmation unit for the user to confirm actions completed by means of utilizing the memory unit or the memory playback unit.

* * * * *